Nov. 11, 1969 W. E. MILROY 3,478,220
ELECTRO-OPTIC CURSOR MANIPULATOR WITH ASSOCIATED LOGIC CIRCUITRY
Filed May 11, 1966 2 Sheets-Sheet 1
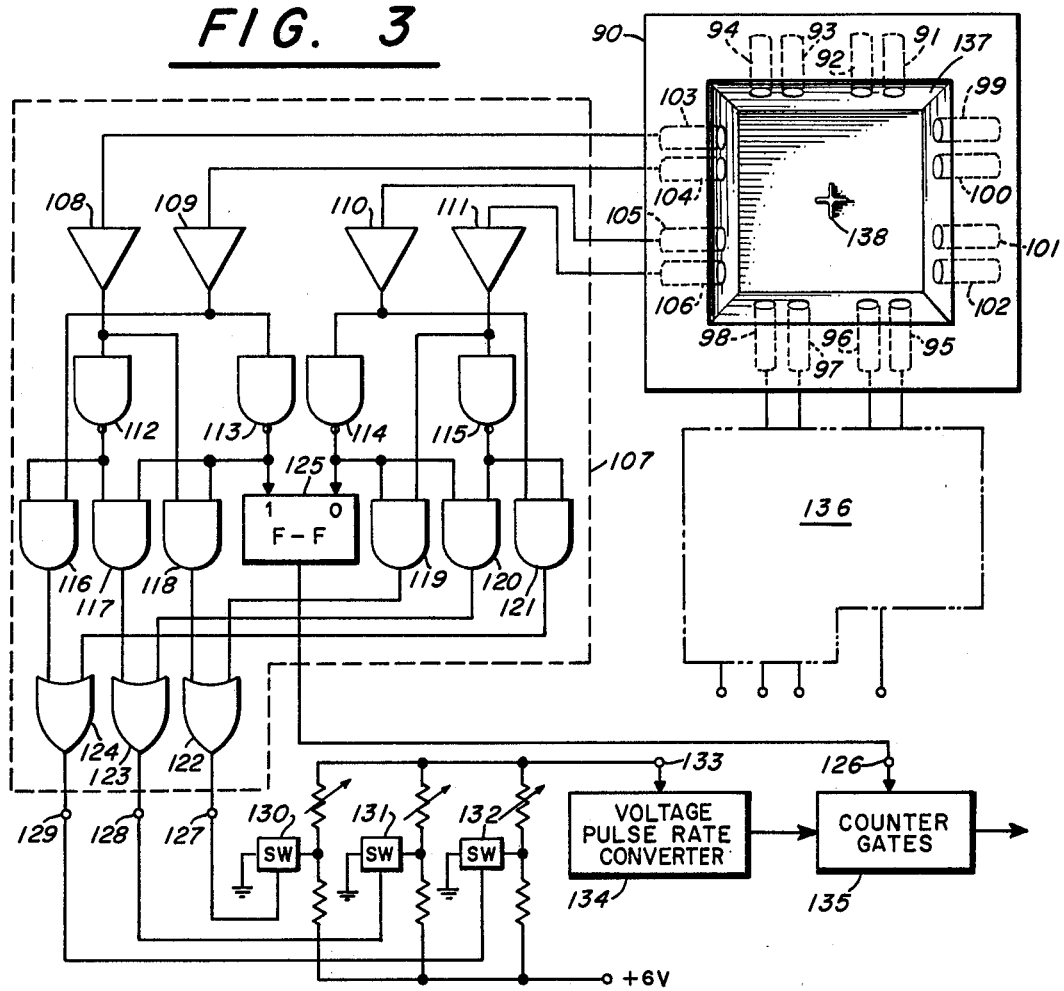
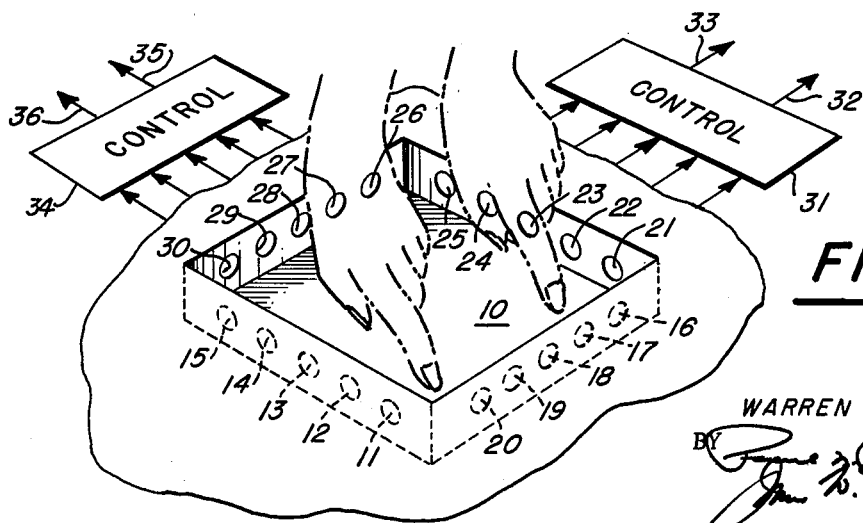
INVENTOR.
WARREN E. MILROY
ATTORNEYS

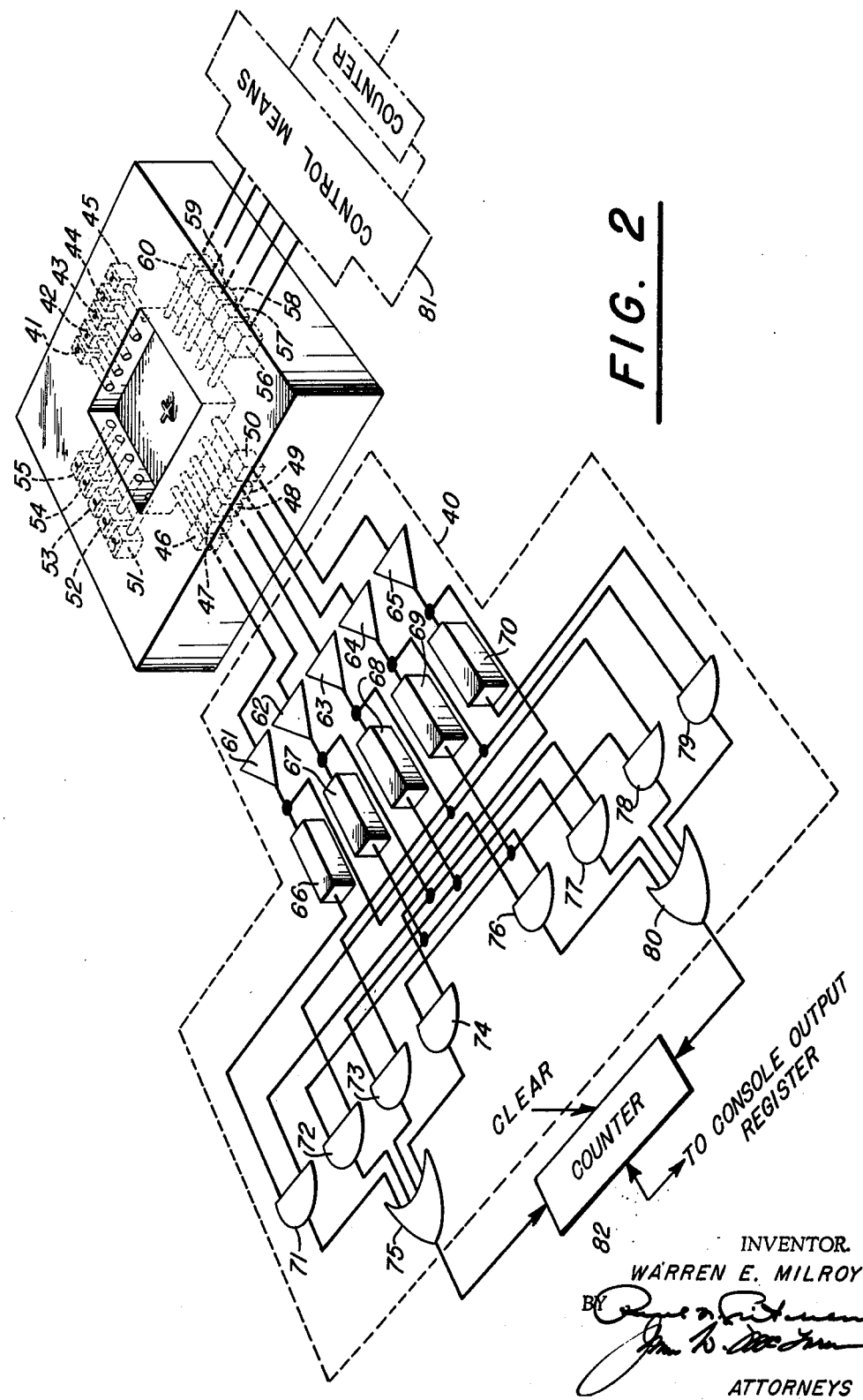

United States Patent Office 3,478,220
Patented Nov. 11, 1969

3,478,220
ELECTRO-OPTIC CURSOR MANIPULATOR WITH ASSOCIATED LOGIC CIRCUITRY
Warren E. Milroy, San Diego, Calif., assignor to the United States of America as represented by the Secretary of the Navy
Filed May 11, 1966, Ser. No. 550,091
Int. Cl. H01j *39/12*
U.S. Cl. 250—221                                    4 Claims

ABSTRACT OF THE DISCLOSURE

An arrangement for automatically positioning a cursor on the screen of a cathode ray tube in response to the position of a human limb, such as a finger, on a control grid. The grid comprises an array of radiant energy sources and sensors arranged to detect the position of the finger by measurement of energy flow interrupted between various aligned pairs of sources and sensors. The device produces an output signal indicative of the finger position which can then be used to similarly position a cursor on the CRT screen.

---

The invention described herein may be manufactured and used by or for the Government of the United States of America for governmental purposes without the payment of any royalties thereon or therefor.

This invention is concerned with a novel system for directing the position of a controllably movable element and more particularly is especially advantageous in changing the disposition of symbols or like visual indicators on the face of a cathode ray tube display as may be desired by an operator who is coordinating data at a console.

Prior art systems for directing the position of a controllably movable element have taken a number of forms when embodied in equipments involving the control of indicia on the face of a cathode ray tube. Such devices and arrangements for controlling the disposition of visual indicia in a cathode ray tube display have been referred to in the art as "cursor manipulators."

One fundamental embodiment of such prior art arrangement included two separate controls usually in the form of knobs each of which was effective to position a symbol or other indicia on the face of a cathode ray tube in one degree of freedom. Thus, one knob might typically control the position of a visual indicia in up and down directions while the other knob control the position of the same visual indicia in right and left directions.

An improvement over this prior art arrangement involved a single control element which was movable about a centrally pivoted point and thus reduced the number of controls to a single manually operable control which is responsive to combined movement in two orthogonally oriented directions so as to control the movement and disposition of visual indicia on a cathode ray tube or similar controllably movable element by simultaneously generating separate signals commensurate with both the desired up and down and sidewise disposition of the controllable element as determined by the movement of the single control means. In its simplest form this arrangement included what is known as a "joy stick" pivotably mounted so as to be readily movable in two degrees of freedom and having appropriate means connected to its lower portion which means were adapted to develop electrical signals in orthogonally oriented senses in response to the movement and disposition of the upper portion of the pivotally mounted "joy stick."

Yet another form of prior art cursor manipulator included a conductive transparent grid element which was disposed over the face of an indicator; when activated by a wiping pen drawn across the conductive grid, commensurate signals were developed for the control of visual indicia on the face of the cathode ray tube in accordance with the disposition and directional movement of the wiping pen relative to the conductive transparent grid.

A more recently developed form of electronic cursor manipulator is known as the "track ball." This arrangement includes a ball which is partially recessed so as to have only a portion of its spherical surface exposed above a planar supporting means. The sphere is arranged to be readily movable in any direction as desired by manual manipulation. Beneath the planar support, appropriate electromechanical linkage is arranged to develop signals in accordance with the movement and disposition of track ball. Such signals are, in turn, employed to direct, change, and control the disposition of a symbol or like visual indicia on the face of a cathode ray tube in accordance with the manipulation of the track ball, synthesizing orthogonally oriented signals which may be typically disposed in horizontal and vertical directions relative to a cathode ray tube. The above described arrangements are generally satisfactory for directing and changing the position of a controllably movable element but many have the common disadvantage of comprising electromechanically operative assemblies which are not readily adaptable to being rendered impervious to severe environmental conditions. Much of this difficulty arises from the necessary use of moving parts. Therefore, it is desirable that a system for directing and changing the position of the controllably movable element as may be desired at the discretion of an operator be so conceived as to be readily adaptable to encapsulation or potting in accordance with known and accepted techniques so as to be rendered entirely impervious to severe environmental conditions.

Accordingly, it is a prime object of the present invention to provide a system for directing the change of position of a controllably movable element which may be readily encapsulated or embodied in a unitized construction which is impervious to severe and detrimental environmental conditions.

An equally important object of the present invention is to provide a system for directing the position of a controllably movable element which is capable of being implemented in embodiments without the use of mechanical means or mechanical linkages.

Yet another object of the present invention is to provide a system for directing and controlling the position of a movable element by appropriate control signals which are developed without the use of any moving parts.

A further object of the present invention is to provide such a system for controlling the position of a movable element by developing control signals in response to the interruption of radiant energy beams.

A still further object of the present invention is to provide a system as described above wherein the control means is responsive to the interruption of energy radiated in like direction for causing a change of position of the controlled element at rates varying as a function of the disposition of the radiated energy relative to a fixed or determinable reference.

The present invention conceives a system for directing the position of a controllably movable element such as a visual indicia on the face of a cathode ray tube and in its most fundamental form may comprise a first plurality of radiant energy sources which are disposed to radiate energy in a first direction. Preferably such radiant energy sources are in parallel alignment with each other and equally spaced. A second plurality of radiant energy sources is similarly disposed to radiate energy in a second direction and across the same general area traversed by the energy radiated from the first plurality of radiant energy sources. A like plurality of radiant energy sensors is arranged and aligned for each of the sensors to receive transmitted energy from one of the first or second plurality of sources. In other words, each source of radiant energy (whether disposed in the first or second direction) is aligned with and transmits a beam of radiant energy to an associated radiant energy sensor. Thus, each radiant energy sensor will produce a signal commensurate with the radiant energy impinging upon it and when one or more beams of radiant energy are interrupted, the affected radiant energy sensors will generate a commensurate signal indicative of the interruption.

In accordance with the concept of the present invention, means operatively associated with each of the radiant energy sensors produces an output signal commensurate with each interruption of transmitted radiant energy. These output signals are received by a control means which is adapted to respond to such signals to cause changes of position of the controllable movable element in two degrees of movement as a result of the sensed interruptions of the radiant energy and in correlation with whether the sensed interruptions affected radiant energy radiated in the first or second directions. In one embodiment of the present invention the multiple interruptions of radiant energy radiated in like direction will cause the controllably movable element to change position in a commensurate direction and at a rate related to the timing of interruptions in any particular sequence.

In a preferred embodiment of the present invention the control means is arranged and adapted to be responsive to the interruption of energy radiated in like direction for causing a change of position of the controllably movable element at different rates which vary as a function of the disposition of the interrupted radiated energy relative to a fixed reference.

These and other objects, advantages and features of the present invention will be more fully understood from the following description of several embodiments together with the accompanying drawings and the novel concept and its scope will be more particularly pointed out in the appended claims.

In the drawings:

FIG. 1 is a partially pictorial perspective view and partially schematic representation of one embodiment of the present invention;

FIG. 2 is a schematic representation of an embodiment of the present invention wherein the controllably movable element is positioned in accordance with the sequence of interruption of radiant energy beams;

FIG. 3 is a preferred embodiment of the present invention employing electrical radiant energy and sensors to position a controllably movable element at a rate and in a direction which is a function of the disposition of an interrupted beam of radiant energy relative to a fixed reference.

In FIG. 1 there is shown a substantially rectangular recessed arrangement 10 such as may be conveniently positioned in the table or desk portion of a control console. Along one side of the recessed portion 10 there are arranged a plurality of sources of radiant energy 11, 12, 13, 14 and 15, which in this case are equally spaced from each other. Along a second side of the recessed arrangement 10 a second plurality of sources of radiant energy 16, 17, 18, 19 and 20 are arranged and disposed to radiate energy in a second direction. The sources of radiant energy 16, 17, 18, 19 and 20 are also equally spaced as were the previously described first plurality of sources of radiant energy 11, 12, 13, 14 and 15 and radiate energy in a direction orthogonally related with respect to the first direction in which the first plurality of sources radiate energy.

Disposed in appropriate alignment opposite to the first plurality of radiant energy sources 11 through 15 are a like plurality of radiant energy sensors 21, 22, 23, 24 and 25. In like manner, arranged and disposed in alignment opposite to the second plurality of radiant energy sources 16 through 20 are a like plurality of radiant energy sources 26, 27, 28, 29 and 30. The radiant energy sensors 21 through 25 are arranged to receive radiant energy radiated in a first direction from the first plurality of radiant energy sources 11 through 15 to produce a plurality of output signals in accordance with the respective radiant energy impinging on each of the radiant energy sensors 21 through 25. Accordingly, upon interruption of radiant energy received at any of the radiant energy sensors, a commensurate signal is produced which is received into a control means 31. The control means 31 is so arranged with appropriate logic circuitry or other similar means adapted to produce output signals at its output terminals 32 or 33 in accordance with the particular sequence of interruption of beams of radiant energy producing like interruption signals at the radiant energy sensors 21 through 25 aligned in the first direction. Similarly the output of the radiant energy sensors 26 through 30 produce outputs which are received in a second control means 34 having a similar arrangement of logic circuitry or other appropriate means to produce one of two outputs at its output terminals 35 and/or 36 in accordance with the sequence of interruption of radiant energy radiated from the second plurality of radiant energy sources 16 through 20 and received at the second plurality of radiant energy sensors 26 through 30.

The output signals generated at the output terminals 32, 33 of control means 31 and the output signals generated at the output terminals 35 and 36 of the control means 34 may be combined, as will be appreciated by those skilled in the art, to synthesize a composite directional signal. Such composite directional signals may, in turn, be employed to direct the change of position of a controllably movable element responsive to a servomechanism means or the visual indicia displayed on a cathode ray tube, for instance.

In actual use an operator positions a finger in the recessed portion 10 of the arrangement illustrated in FIG. 1 and moves his finger to successively interrupt beams to produce movement and change of position of the element being controlled as may be desired. In some embodiments of the present invention the sequence of beams which are interrupted may be determinative of the direction of movement of the controlled element; in other embodiments of the invention the positional disposition of the interrupted beam, rather than the sequence, may be determinative of both the rate and direction of movement of the controlled element.

Thus, in the former instance, the operator may repeat sequential interruptions in a given direction to sustain continued movement of the controlled element. This is accomplished by the operator repeatedly moving his finger through successive positions as illustrated by the several pictorial dashed-line outlines of FIG. 1.

FIG. 2 illustrates in more detail a particular embodiment of the present invention wherein light energy sources are employed together with photoelectric responsive sensors and appropriate logic circuitry to develop the signals required to directionally control a movable element in accordance with the concept of the present invention. In FIG. 2 a plurality of light sources 41 through 45 are disposed so as to radiate light energy in a first direction in a parallel array. The light sources 41 through 45 are equally spaced in arrangement and are aligned with photoelectric cells 46 through 50 which are disposed in an opposed equally spaced array.

In a similar cooperative arrangement, a plurality of light sources 51 through 55 are arranged in an equally spaced array in a second direction which is orthogonal to the first direction of the first plurality of lamps 41 through 45. The parallel equally spaced beams of light generated by the second array of lights sources 51 through 55 pass over the same area as the first plurality of light sources 41 through 45. In a manner much the same as that previously described with respect to the first array of photoelectric cells, a second array of photoelectric cells 56 through 60 is arranged and disposed to receive the light emanating from the second plurality of light sources 51 through 55.

The outputs of photoelectric cells 46, 47, 48, 49 and 50 are received in appropriate amplification means 61, 62, 63, 64 and 65, respectively, which form a portion of the control means 40. The outputs of amplifiers 61, 62, 63, 64 and 65 are functions of the signals produced by the respectively connected photoelectric cells 46, 47, 48, 49 and 50 and such amplified signals are connected in a logic circuitry arrangement which includes the differentiating devices 66, 67, 68, 69 and 70 as well as the gates 71, 72, 73, 74 and 75 which collectively cooperate to produce signals commensurate with movement directed in a first direction of one degree of freedom of movement.

The system illustrated in FIG. 2 operates as follows. If the radiant energy beam received by the radiant energy sensor 48 is intercepted, there is a change-of-state signal transmitted to the input of amplifiers 63. This signal is transmitted by connection to both the AND gates 72 and 78. The signal is also differentiated by the differentiator 68 and its output is impressed upon AND gate 77 and AND gate 73.

If the radiant energy impinging upon the radiant energy sensor 49 is next intercepted, a change-of-state signal is developed which is received at amplifier 64, appropriately amplified and connected for transmission to AND gate 79 as well as AND gate 73. Since the AND gate 73 had already been enabled by the previous signal received as a first input from the differentiator 68, it produces an output signal which passes through the OR gate 75 and is transmitted to the counter 82.

The output of the OR gate 75 indicates movement in a first direction where as the output of the OR gate 80 indicates movement in the opposite direction. Accordingly, if the radiant energy impinging upon the sensor 47 were interrupted, instead of the radiant energy impinging upon the sensor 49, a signal would be developed at the input to amplifier 62 which would be transmitted by connection to both AND gates 71 and AND gate 77. Since the AND gate 77 has been previously enabled by the output of the differentiator 68, it produces an output which passes through the OR gate 80 indicating a movement of one count but in a different direction from that which the output of the OR gate 75 indicates.

Following this procedure of operation one step further for purposes of fuller explanation, it will be seen that if the radiant energy impinging upon sensor 46 is next interrupted, a change-of-state signal will be transmitted to the amplifier 61 and connected to the AND gate 76 which has been previously enabled by the output of differentiator 67, thus producing an output from the AND gate 76 which is transmitted through the OR gate 80 to produce another count indicating further movement in that direction associated with the output of OR gate 80.

In a similar manner, manipulation causing the interruption of the radiant energy impinging upon the sensors 46 through 50 in the opposite direction, functions to provide output counts from the OR gate 75 to indicate the movement in the direction associated with the output of OR gate 75. Thus, the counter produces an output commensurate with the sense of the input which it received, i.e., input pulses from either OR gate 75 or the OR gate 80 and of an amplitude which reflects the number of pulses in each direction. Such output when imposed upon the controlled cathode ray tube can be made to position a symbol or other indicia in a position commensurate with the manipulation performed to interrupt the radiant energy beams.

A second plurality of gates 76, 77, 78, 79 and 80 are arranged and connected to receive the outputs of amplifiers 61 through 65 and the differentiating means 66 through 70 produce an appropriate output for directing movement in a second direction of the same degree of freedom of movement. The control means 40, the amplifiers, gates, and associated arrangements may be connected in accordance with Boolean algebra derived logic to produce the desired results and the outputs from gates 75 and 80 provide signals which cause movement in each of two directions of one degree of freedom in accordance with the sequence of beam interruptions.

The outputs from photo cells 56 through 60 are likewise connected to a control means 81 which may comprise appropriate logic circuitry substantially similar in arrangement and function to that previously described and embodied within the control means 40. Thus, the control means 81 will produce two outputs which are appropriate to control and direct the movement of a controllably movable element in each of two directions in a second degree of freedom. Most commonly, the two degrees of freedom may be orthogonally related; the two directions of a first degree of movement may be up and down, for instance, while the two directions of a second degree of movement may be right and left. The operator must interrupt a sequence of beams to cause change of position of the controllably movable element and such sequential interruptions must be repeated as necessary to achieve the desired new position.

The two outputs from the control means 40 are impressed upon a counter 82, which counts not only the number of signals, but detects the sequential sense of direction of such signals by reason of the logic circuitry arrangements within the control means 40 producing a commensurately oriented output at one of its output signal terminals. A counter 82, in turn, produces an output commensurate with a particular digital number representative of an X or Y coordinate, for example, to cause the change of position of the controllably movable element such as a symbol or visible indicia on the face of a cathode ray tube.

In a like manner, the two outputs of the control means 81 associated with the other degree of freedom of movement directed and controlled in accordance with the concept of the present invention, are fed to a counter 83 producing an output substantially similar to that previously described in connection with the counter 82. The output from the counter 83 controls the other degree of freedom of movement of the controllable element to direct its change of position by the combination of equipment as embodied in the concept of the present invention.

FIG. 3 schematically illustrates the arrangement of a variant version of the present invention. The embodiment of FIG. 3 comprises a first plurality of light sources disposed as illustrated at 91, 92, 93 and 94 in a supporting body element 90. It will be noted that the light sources 91, 92, 93 and 94 are arrayed so as to radiate energy in parallel direction but are not equally spaced as was the case with the arrangement previously illustrated and described in connection with the embodiment of FIG. 2. Aligned with the first plurality of light sources 91 through 94 are a like plurality of light energy sensors 95 through 98 each of which is arranged and supported within the body element 90 so as to receive radiated light energy from a respective one of the light sources.

In a similar manner, a second plurality of light sources 99, 100, 101 and 102 is arranged, disposed and supported in the body element 90 and orthogonally oriented with respect to the first plurality of light sources so as to radiate parallel light beams across the same area as the first plurality of light sources. A second plurality of light energy sensors 103, 104, 105 and 106 are arranged and disposed and supported within the body element 90 so that each such sensor is aligned to receive light energy from a respective one of the second plurality of light energy sources 99 through 102.

The beams of light energy radiated from the light energy sources 99 through 102 impinge upon the respective light energy sensors 103, 104, 105 and 106 producing output signals which are received into a control element 107. The control means 107 comprises a plurality of amplifiers 108, 109, 110 and 111 which receive the respective outputs from light energy sensors 103, 104, 105 and 106. The amplified signals which comprise the output from amplifiers 108 through 111 are arranged and connected in circuit with a plurality of gates 112 through 124 together with a bistable element 125 in accordance with a logic arrangement producing four outputs at terminals 126, 127, 128 and 129. The logic circuitry of the control means 107 is so devised in accordance with suitable logic design as to provide an output at terminal 126 which is indicative of the direction of the signal generated as a result of manipulative interruption of the previously described beams of radiant energy in the form of light beams.

If, for example, the radiant energy reaching the sensor 104 is interrupted, a change-of-state signal is developed which is amplified through amplifier 109 and impressed upon gate 113 whose characteristic is to produce a signal upon change-of-state. That is to say, gate 113 produces an output signal when its input ceases. This output signal also produces a "1" output from flip-flop 125 indicating the sense of the count to the counter gate 135, thus actuating the counter gate 135 to either count up or down in accordance with the sense of the signal received from flip-flop 125.

The output signal of gate 113 is also impressed upon the AND gate 118. The second input to AND gate 118 is the signal developed by the continuing radiant energy received at sensor 103, amplified in amplifier 108, and connected to the AND gate 118. Thus, the AND gate 118 is actuated and transmits its output to OR gate 122 whence it is connected through its output terminal 127 to actuate switch 150, impressing a predetermined amplitude of voltage upon the voltage pulse rate converter 134 through terminal 133. The voltage amplitude is converted to a commensurate pulse rate output by the voltage rate converter 134 and connected as a pulsed input to the counter gates 135. Thus, the pulses received are counted up or down in accordance with the manner in which the output of the flip-flop 125 has previously been determined; in this case, as a "1" output which may, for instance, represent a count up.

If the radiant energy reaching the sensor 103 is manipulatively interrupted, the change-of-state signal reaches amplifier 108 cutting off one of the inputs to the AND gate 118, but at the same time causing the gate 112 to produce an output which is impressed upon both AND gates 116 and 117. If the radiant energy reaching the sensor 104 is interrupted at the same time as that radiant energy received by 103, the gates 112 and 118 both produce an output, thereby actuating the AND gate 117 to produce an output. The output signal of AND gate 117 is passed through the OR gate 123 to the output terminal 128, actuating switch 131 which produces a commensurately higher voltage at the input terminal 133 to the voltage rate converter 134. The higher voltage increases the pulse rate output which is impressed upon the counter gates 135, causing the symbol or indicia on the face of the cathode ray tube to be moved more quickly and rapidly to a desired position. At the same time it will be appreciated that since the radiant energy reaching sensor 103 has been interrupted, the signal realized through amplifier 108 and imposed upon AND gate 118 does not exist; therefore, AND gate 118 ceases to be actuated and accordingly no signal is transmitted through OR gate 122 and the output terminal 127, causing the switch 130 to become inactivated.

Assuming now for purposes of explanation, that only the radiant energy reaching sensor 103 is manipulatively interrupted, it will be seen that the change-of-state signal causes an output from gate 112 which is impressed upon the AND gate 116. The radiant energy reaching sensor 104 provides, through amplifier 109, the second input necessary to actuate the AND gate 116, thereby producing an output which is impressed upon the OR gate 124 and transmitted to output terminal 129. This output signal is connected to actuate switch 132 which provides an even greater amplitude of voltage transmitted through the terminal 133 to the voltage rate converter 134. Accordingly, a still greater pulse rate output is produced by the converter 134 as an input to the counter gates, 135, causing the indicia or symbol to be moved on the face of the cathode ray tube with even greater rapidity.

Substantially the same operation is realized in the opposite direction as, for instance, when the radiant energy reaching sensors 105 or 106 is interrupted and the flip-flop 125 is caused to produce a "0" output which is received at the input terminal 126 of the counter gates 135, indicating a direction of movement in the opposite direction. It should be remembered that the operative characteristic of the gates 112, 113, 114, and 115 in accordance with principles of Boolean algebra and related logic design is such that they produce an output upon the absence of an input signal. Thus, the gates 114 and 115 as well as gates 119, 120, and 121 operate in a manner substantially identical to that previously described in connection with gates 112, 113, and gates 116, 117, and 118, respectively to actuate the switches 130, 131, and 132 providing inputs of commensurately varying amplitude voltage to the voltage-to-pulse rate converter 134. The correlated rate of pulses causes consequent movement of a symbol or indicia on the face of a cathode ray tube with varying rapidity and in a direction commensurate with the "1" or "0" setting of flip-flop 125.

The output terminals 127, 128 and 129 develop signals as a function of the particular beams of the second plurality of light energy sources which are interrupted by manual manipulation within the recessed portion 137 of the base element 90. Thus the outputs at terminals 127, 128 and 129 vary in accordance with the particular light beams which are interrupted and are operative to actuate respective switch means 130, 131 or 132, the switch means, in turn, each controlling the generation of a different amplitude of voltage produced at the terminal 133.

In some embodiments of the present invention, the signal directing the change of position of a controllable element may be taken directly from terminal 133 together with that developed at terminal 126 to control both the direction and the rate of change of the controllably movable element in one degree of freedom. If desired, however, the signal developed at terminal 133 may be impressed upon a voltage-to-pulse rate converter 134 as illustrated in FIG. 3 which, together with the signal developed at terminal 126, is impressed upon a counter gate 135 to control the direction of movement as well as the rate of movement of the controllably movable element within a second degree of freedom as it is positioned and directed by the equipment embodied in the FIG. 3 in accordance with the concept and teaching of the present invention.

The outputs derived from the light energy sensors 95, 96, 97 and 98 which receive parallel radiant energy beams from the first plurality of light sources 91, 92, 93 and 94 are received into a control means 136 which is substantially identical to that previously described in connection with the control means 107 and develops similar output signals which are employed to control the direction and rate of the second degree of movement of the controllably movable element.

It will be noted that the embodiment of FIG. 3 has within its recessed portion 137 of the body element 90, a centrally located fixed reference as represented by the embossed +, shown at 138. Such reference point may be a slightly raised embossment on the base portion of the recess 137 so as to provide a reference point for an operator which is readily discernible by touch. Accordingly, an operator by placing a finger in the recess 137, locates the central reference point 138 and no beams of light are interrupted. Upon movement of the operator's finger, forward or back, or right or left, one or more beams will be interrupted and the rate of change of position as well as the direction and the degree of freedom of movement of the controllable element will be directed in accordance with the light beams interrupted and the relative disposition of such light beams with respect to the central reference 138. Thus, in use the operator is able to orient his finger in the recess 137 and more particularly with respect to the centrally located reference point 138, wholly by touch means. In the embodiment of FIG. 3 interruption of the innermost beam will cause a low rate of change; interruption of the innermost beam and outer beams simultaneously will cause a greater rate of change, while interruption of the outer beam solely will cause the fastest rate of change.

The embodiment as disclosed and illustrated in FIG. 3 includes the advantageous feature of providing a capability of directing not only the position, but also the rate of change of position of the controllably movable element which is directed and positioned through the use of the equipment as previously described.

Those knowledgeable in the art will appreciate that the present invention conceives a system for directing and positioning a controllably movable element as may be desired by an operator which may be embodied in wholly electronic, solid-state, components appropriately arranged and connected as described. Such an embodiment, accordingly, may be completely encapsulated so as to be entirely impervious and independent of severe environmental conditions. As a consequence, the present invention provides greater reliability as well as being less costly in initial cost and maintenance as well.

The absence of moving mechanical parts in the equipment of the present invention avoids operational breakdown and provides a higher degree of reliability in use. Moreover, the present invention is readily adaptable to embodiment in small, microminiature, solid state components providing smaller, more compact equipment in addition to its other advantages and features. Additionally, the obvious simplicity and logically related basis of operation of the present invention from the operator's point of view lends it readily understandable so as to facilitate the training and indoctrination of operators.

Moreover, it will be apparent to those skilled in the art that the concepts and circuitry involved in the concept of the present invention are essentially digital in nature which accommodates embodiments of the present invention to use with computer and data processing equipment such as are commonly employed where a controllably movable element is directed in accordance with received or ascertained digital data.

Obviously many modifications and variations of the present invention are possible in the light of the above teachings. It is therefore to be understood that within the scope of the appended claims the invention may be practiced otherwise than as specifically described.

What is claimed is:

1. A system for directing the position of a controllably movable element comprising;
   a first plurality of radiant energy sources disposed to radiate energy in a first direction,
   a second plurality of radiant energy sources disposed to radiate energy in a second direction,
   like pluralities of radiant energy sensors arranged and aligned for each to receive transmitted radiant energy from one of said first or second pluralities of sources,
   means operatively associated with each of said radiant energy sensors for producing an output signal commensurate with each said interruption of said transmitted radiant energy,
   said output signal varying as an analog function of the spatial disposition of each said interruption of said radiant energy relative to a fixed reference, and
   control means arranged to receive said output signals and adapted to cause the change of position of said controllably movable element in two degrees of movement in accordance with the sensed interruptions of said radiant energy radiated in said first and second directions.

2. A system for directing the position of a controllably movable element as claimed in claim 1 and including means responsive to said analog output signal for producing pulsed output signals at rates varying as a function of the disposition of said radiated energy relative to a fixed reference.

3. A system for directing the position of a controllably movable element as claimed in claim 2 wherein said pulsed output signals vary at an increased rate commensurate with increased spatial disposition of the interrupted radiant energy relative to said fixed reference.

4. A system for directing the position of a controllably movable element as claimed in claim 3 wherein said control means includes a counter operatively responsive to varying rates of pulsed output signals for causing said change of position of said controllably movable element at commensurately varying rates.

References Cited

UNITED STATES PATENTS

| | | | |
|---|---|---|---|
| 2,571,974 | 10/1951 | Walker | 250—222 |
| 2,595,993 | 5/1952 | Templeman et al. | 250—221 |
| 3,016,421 | 1/1962 | Harmon | 250—222 |

RALPH G. NILSON, Primary Examiner

M. ABRAMSON, Assistant Examiner